US012639479B2

(12) United States Patent
Lee

(10) Patent No.: US 12,639,479 B2
(45) Date of Patent: May 26, 2026

(54) STORAGE DEVICE AND COMPUTING DEVICE INCLUDING THE SAME

(71) Applicant: SAMSUNG ELECTRONICS CO., LTD., Suwon-si (KR)

(72) Inventor: Hanju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 174 days.

(21) Appl. No.: 18/535,646

(22) Filed: Dec. 11, 2023

(65) Prior Publication Data

US 2024/0220667 A1 Jul. 4, 2024

(30) Foreign Application Priority Data

Jan. 2, 2023 (KR) ........................ 10-2023-0000364

(51) Int. Cl.
*G06F 21/79* (2013.01)
*G06F 21/60* (2013.01)
*G06F 21/74* (2013.01)

(52) U.S. Cl.
CPC ............ *G06F 21/79* (2013.01); *G06F 21/602* (2013.01); *G06F 21/74* (2013.01)

(58) Field of Classification Search
CPC ........ G06F 21/79; G06F 21/602; G06F 21/74; G06F 21/21
See application file for complete search history.

(56) References Cited

U.S. PATENT DOCUMENTS

| | | | |
|---|---|---|---|
| 9,792,448 B2 | 10/2017 | Kaplan et al. | |
| 10,176,122 B2 | 1/2019 | Kaplan et al. | |
| 10,417,433 B2 | 9/2019 | Kelso et al. | |
| 10,565,130 B2 | 2/2020 | Chhabra et al. | |
| 11,237,986 B1 | 2/2022 | Raskin | |
| 11,283,635 B2 | 3/2022 | Smith et al. | |
| 2005/0005092 A1* | 1/2005 | Jeong | G11B 20/0021 |
| | | | 713/150 |
| 2009/0013196 A1* | 1/2009 | Ito | H04L 9/3236 |
| | | | 713/193 |
| 2021/0057002 A1* | 2/2021 | Chen | H04L 9/0618 |
| 2021/0349640 A1 | 11/2021 | Frolikov | |
| 2021/0406054 A1 | 12/2021 | Tsirkin et al. | |
| 2022/0114002 A1 | 4/2022 | Hoogerbrugge et al. | |

FOREIGN PATENT DOCUMENTS

EP 3 926 471 A1 12/2021

OTHER PUBLICATIONS

Communication dated May 13, 2024, issued by the European Patent Office in European Application No. 23218760.9.
Nvm Express Workgoup, "NVM Express® Base Specification", Revision 2.0c, Oct. 4, 2022, total 140 pages, XP093154731.

* cited by examiner

*Primary Examiner* — Matthew T Henning

(74) *Attorney, Agent, or Firm* — Sughrue Mion, PLLC

(57) ABSTRACT

A storage device includes a non-volatile memory, and a storage controller configured to read a non-encrypted command from a memory outside the storage device. The storage controller is also configured to transmit encrypted data to the non-volatile memory or the memory based on the non-encrypted command, and transmit a non-encrypted completion to the memory. The non-encrypted completion indicates a result of executing the non-encrypted command.

20 Claims, 12 Drawing Sheets

STORAGE DEVICE AND COMPUTING DEVICE INCLUDING THE SAME

CROSS-REFERENCE TO RELATED APPLICATIONS

This application is based on and claims priority under 35 U.S.C. § 119 to Korean Patent Application No. 10-2023-0000364, filed on Jan. 2, 2023, in the Korean Intellectual Property Office, the disclosure of which is incorporated by reference herein in its entirety.

BACKGROUND

The present disclosure relates to a storage device having enhanced data security performance and a computing device including the same.

The storage device is a device for storing data and may include a device storing data in a hard disk drive (HDD), a solid state drive (SSD), and a memory card, in particular, a non-volatile memory.

The storage device may store various types of data under control by a processor within a computing device. In this case, the storage device may store data that should not be leaked out, such as personal information and a password of a user.

When a computing device of the related art is to store data in an internal storage device, an internal processor of the computing device scrambles unencrypted original data and stores the same in a memory such as dynamic random access memory (DRAM), and the internal storage device of the computing device may store data stored in the memory as it is.

With recent technological development, the computing device may encrypt data using the internal processor of the computing device and store the same in an internal memory and storage device. In this case, when the processor encrypts all pieces of data and stores in the memory and storage device, the storage device should decrypt a command written by the processor to perform an accurate operation based on the command of the processor. However, when the storage device receives a shared key used for encryption from the processor to decrypt the command, there is a risk of exposure of the key shared with the storage device. Accordingly, even when encrypted data is stored in the storage device, there is a risk of leakage of the data by a malicious user.

SUMMARY

Example embodiments provide a storage device capable of preventing leakage of data due to extortion of an encrypted key, and a computing device including the storage device.

According to some embodiments, there is provided a storage device including a non-volatile memory, and a storage controller configured to read a non-encrypted command from a memory outside the storage device, transmit encrypted data to the non-volatile memory or the memory based on the non-encrypted command, and transmit a non-encrypted completion to the memory, the non-encrypted completion indicating a result of executing the non-encrypted command.

According to an aspect of an example embodiment, there is provided a computing device including a memory, a processor configured to generate encrypted data by encrypting data, write the encrypted data into the memory, and write a non-encrypted write command into the memory, and a storage device including a non-volatile memory and a storage controller, wherein the storage controller is configured to read the non-encrypted write command from the memory, transmit the encrypted data to the non-volatile memory based on the non-encrypted write command, and transmit a non-encrypted completion to the memory, the non-encrypted completion indicating a result of executing the non-encrypted write command.

According to an aspect of an example embodiment, there is provided a computing device including a memory, a processor configured to generate encrypted data by encrypting data by using a first encryption key, write the encrypted data into the memory, generate an encrypted write command by encrypting a write command by using a second encryption key, and write the encrypted write command into the memory, and a storage device including a non-volatile memory and a storage controller, wherein the storage controller is configured to read the encrypted write command from the memory, generate the write command by decrypting the encrypted write command by using the second encryption key, transmit the encrypted data to the non-volatile memory based on the write command, and transmit an encrypted completion to the memory, the encrypted completion indicating a result of executing the write command.

BRIEF DESCRIPTION OF THE DRAWINGS

Embodiments will be more clearly understood from the following detailed description taken in conjunction with the accompanying drawings, in which:

FIG. 2 is a block diagram illustrating in more detail a processor and a memory of a computing device, according to an embodiment;

FIG. 8 is a block diagram of a processor and a memory of a computing device according to an embodiment;

DETAILED DESCRIPTION

Hereinafter, embodiments will be described in detail with reference to the accompanying drawings.

Figure 1:
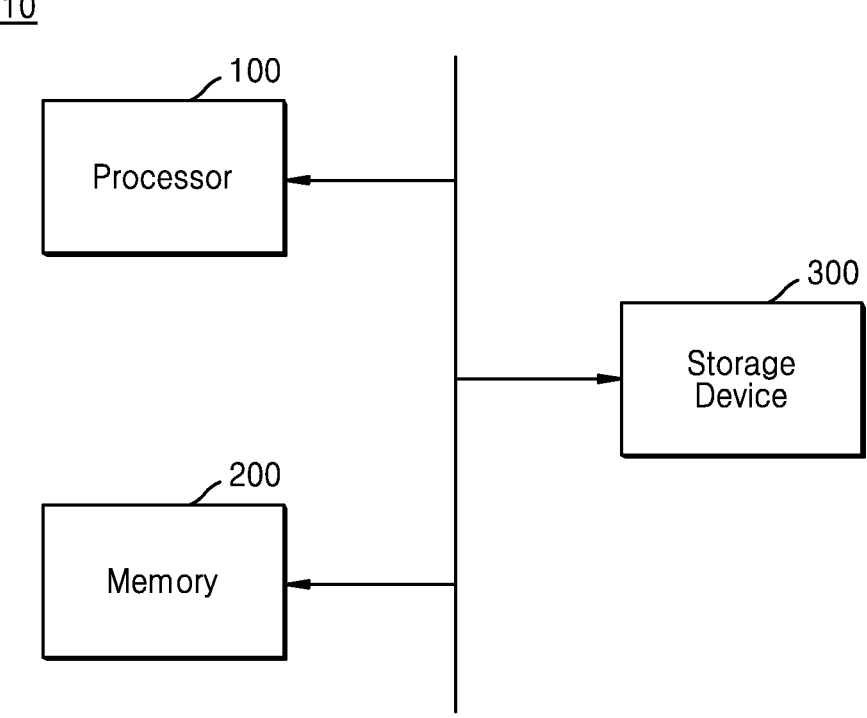
FIG. 1 is a block diagram of a computing device according to an embodiment.

FIG. 1 is a block diagram of a computing device 10 according to an embodiment.

Referring to FIG. 1, the computing device 10 according to an embodiment may include a processor 100, a memory 200, and a storage device 300.

The processor 100 may control overall an operation of the computing device 10, and in an embodiment, the processor 100 may include a central processing unit (CPU).

The processor 100 may write data into the storage device 300. For this, the processor 100 may write, into the memory 200, data to be written into the storage device 300 and write, into the memory 200, a write command instructing writing of the data into the storage device 300. In this case, the processor 100 may encrypt the data to be written into the storage device 300 and write the data into the memory 200. In addition, the processor 100 may write the write command into the memory 200 without encrypting the write command.

Hereinafter, data in a state not encrypted by the processor 100 may be referred to as original data or non-encrypted data, data in a state encrypted by the processor 100 may be referred to as encrypted data, and a write command in an unencrypted state may be referred to as a non-encrypted write command.

The processor 100 may read data stored in the storage device 300. For this, the processor 100 may write, into memory 200, a read command instructing reading of the data stored in the storage device 300. In this case, the processor 100 may write the read command into the memory 200 without encrypting the read command.

Hereinafter, a read command in an unencrypted state is referred to as a non-encrypted read command. Also, the write command and the read command may be collectively referred to as a command, and a command in an unencrypted state may be referred to as a non-encrypted command.

The processor 100 may read a completion indicating a result of executing a command from the memory 200. In this case, the completion may be in an unencrypted state.

Hereinafter, the completion in the unencrypted state may be referred to as a non-encrypted completion.

The memory 200 may store encrypted data to be written into the storage device 300 and encrypted data read from the storage device 300. Also, the memory 200 may store a non-encrypted command to be transmitted from the processor 100 to the storage device 300. Also, the memory 200 may store a non-encrypted completion corresponding to the non-encrypted command.

The memory 200 may include an encrypted area and a non-encrypted area.

The encrypted data may be stored in the encrypted area of the memory 200. The encrypted data may be written into the memory 200 by the processor 100. Also, the encrypted data may be read from the storage device 300 and written into the memory 200.

The non-encrypted command and the non-encrypted completion may be stored in the non-encrypted area of the memory 200. The non-encrypted command may be written into the memory 200 by the processor 100. The non-encrypted completion may be written into the memory 200 by the storage device 300.

The memory 200 may include a volatile memory including static random access memory (SRAM), dynamic RAM (DRAM), and the like. However, embodiments are not limited thereto. The memory 200 may include any type of memory accessible by the processor 100, for example, a non-volatile memory such as a flash memory, phase-change RAM (PRAM), magnetic RAM (MRAM), and ferroelectric RAM (FeRAM).

The storage device 300 may perform a data write operation or a data read operation based on a command written into the memory 200 by the processor 100.

The storage device 300 may read the non-encrypted command from the memory 200. When the non-encrypted command read from the memory 200 is a non-encrypted write command, the storage device 300 may read encrypted data from the memory 200 and write the encrypted data into an internal non-volatile memory of the storage device 300.

When the non-encrypted command read from the memory 200 is a non-encrypted read command, the storage device 300 may read encrypted data from the internal non-volatile memory and write the encrypted data into the memory 200.

The storage device 300 may generate a non-encrypted completion corresponding to the executed non-encrypted command and write the non-encrypted completion into the memory 200.

In an embodiment, the storage device 300 is a concept including a non-volatile memory and a controller that controls the non-volatile memory, and may be defined as various terms other than the storage device. For example, the storage device 300 may be referred to as a memory system or a storage system, and a controller included in a storage device 300 may be referred to as a storage controller or a memory controller. Hereinafter, the controller included in the storage device 300 is referred to as a storage controller to be identified from a controller that controls the memory 200.

The storage device 300 may include storage media that store data according to a command from the processor 100. For example, the storage device 300 may include one or more solid state drives (SSDs). When the storage device 300 includes an SSD, the non-volatile memory may include a plurality of flash memory chips (e.g., negative AND (NAND) memory chips) that store data in a non-volatile manner.

As another example, the storage device 300 may also include various types of non-volatile memories. For example, for the non-volatile memory, various types of memories may be applied, such as MRAM, spin-transfer torque MRAM, conductive bridging RAM, FeRAM, PRAM, resistive RAM (RRAM), nanotube RAM, polymer RAM (PoRAM), a nano-floating gate memory (NFGM), a holographic memory, a molecular electronics memory, or an insulator resistance change memory.

A more detailed configuration and operation of the processor 100, the memory 200, and the storage device 300 included in the computing device 10 according to an embodiment will be described with reference to FIGS. 2 and 3.

Figure 2:
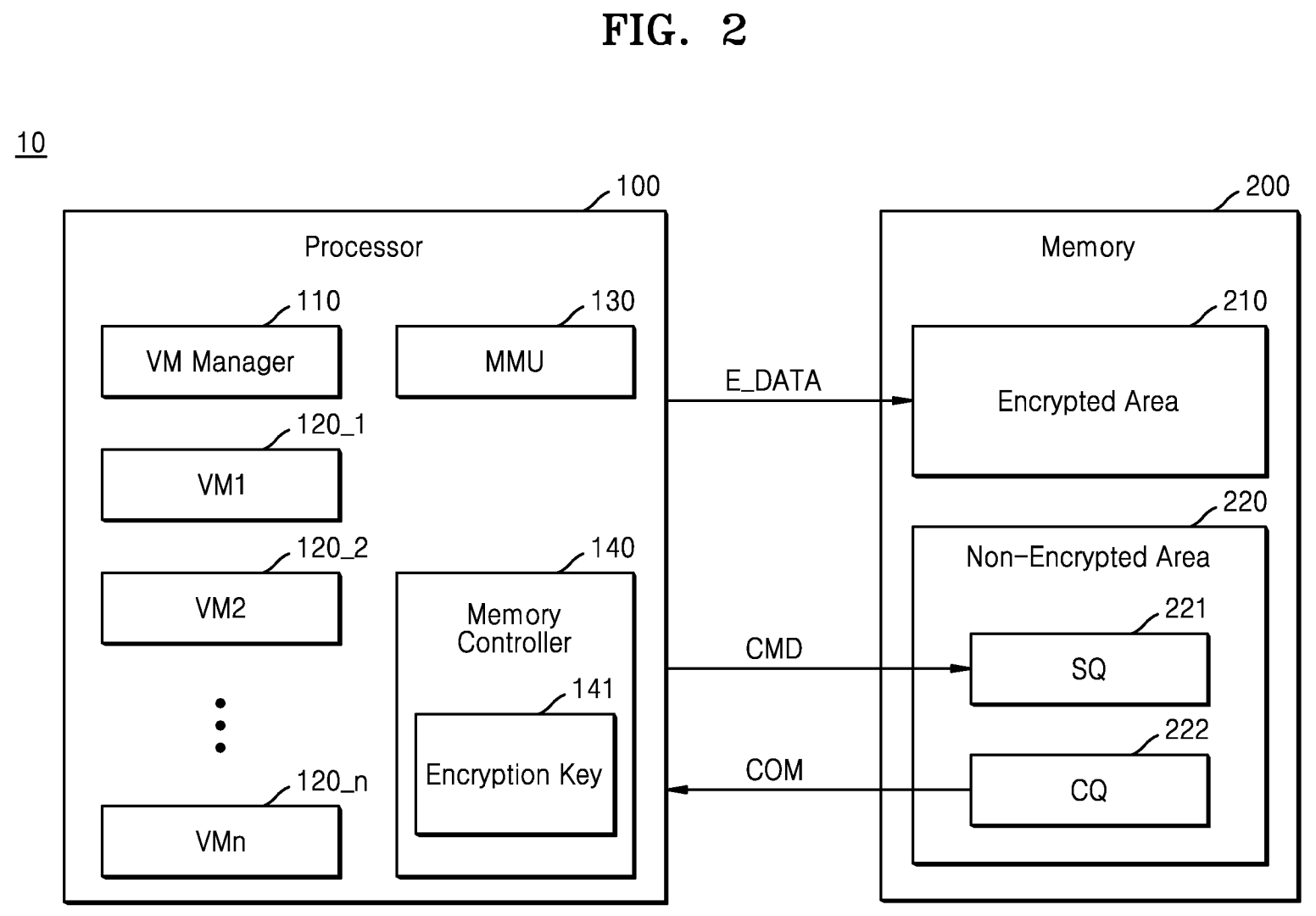

FIG. 2 is a block diagram illustrating in more detail a processor 100 and a memory 200 of a computing device 10, according to an embodiment.

Referring to FIG. 2, the processor 100 of the computing device 10 according to an embodiment may include a virtual machine (VM) manager 110, a plurality of VMs 120_1 to 120_n, a memory management unit (MMU) 130, and a memory controller 140.

The VM manager 110 may generate and execute the plurality of VMs 120_1 to 120_n within the processor 100. That is, the VM manager 110 may manage the plurality of VMs 120_1 to 120_n.

The VM manager 110 may be implemented through hardware, software, or a combination thereof. The VM manager 110 may also be referred to as a hypervisor.

The plurality of VMs 120_1 to 120_n may share sources included in the processor 100. Each of the plurality of VMs 120_1 to 120_n may individually operate as a single device.

The plurality of VMs 120_1 to 120_n may access the storage device 300. In this case, the plurality of VMs 120_1 to 120_n may write data into the storage device 300 or read data stored in the storage device 300.

When data is to be written into the storage device 300, the plurality of VMs 120_1 to 120_n may write original data and a non-encrypted write command into the memory 200 through the MMU 130 and the memory controller 140.

When the data stored in the storage device 300 is to be read, the plurality of VMs 120_1 to 120_n may write a non-encrypted read command into the memory 200 through the MMU 130 and the memory controller 140.

The MMU 130 may convert a virtual address included in a non-encrypted command CMD transmitted by the plurality of VMs 120_1 to 120_n into a physical address. Also, the MMU 130 may identify access rights of the plurality of VMs 120_1 to 120_n to the memory 200 and determine whether to transmit the non-encrypted command CMD transmitted by the plurality of VMs 120_1 to 120_n to the memory controller 140.

The MMU 130 may manage an encrypted area 210 and a non-encrypted area 220 of the memory 200. The MMU 130 may identify the encrypted area 210 from the non-encrypted area 220 of the memory 200 based on a physical address of a storage space included in the memory 200.

The memory controller 140 may control an overall operation of the memory 200. The memory controller 140 may operate based on the original data and the non-encrypted command CMD transmitted from the plurality of VMs 120_1 to 120_n.

When the plurality of VMs 120_1 to 120_n are to write data into the storage device 300, the memory controller 140 may generate encrypted data E_DATA by encrypting the original data, and write the encrypted data E_DATA and the non-encrypted command CMD into the memory 200.

The memory controller 140 may generate the encrypted data E_DATA by encrypting the original data by using an encryption key 141.

The encryption key 141 is a key used for encryption and decryption of original data and may include a dedicated encryption key used inside the processor 100. In this case, the dedicated encryption key may only be used for encryption of original data in the memory controller 140 inside the processor 100, and may not be transmitted to the outside of the processor 100 or shared with other devices outside the processor 100. Accordingly, the encrypted data E_DATA may not be decrypted outside the processor 100, and leakage of the encryption key 141 through the storage device 300 or the memory 200 may be prevented.

The memory controller 140 may write the encrypted data E_DATA into the encrypted area 210 of the memory 200.

The memory controller 140 may not encrypt the non-encrypted command CMD unlike the original data. In addition, the memory controller 140 may store the non-encrypted command CMD in a submission queue (SQ) 221 of the non-encrypted area 220 of the memory 200.

When the plurality of VMs 120_1 to 120_n attempt to read data stored in the storage device 300, the memory controller 140 may write the non-encrypted command CMD into the memory 200. In this case, the memory controller 140 may store the non-encrypted command CMD in the SQ 221 of the non-encrypted area 220 of the memory 200 without encrypting the non-encrypted command CMD.

The memory controller 140 may read a non-encrypted completion COM from the memory 200. In this case, the memory controller 140 may read the non-encrypted completion COM from a completion queue (CQ) 222 of the non-encrypted area 220 of the memory 200. In addition, the memory controller 140 may identify a result of the storage device 300 executing the non-encrypted command CMD based on the non-encrypted completion COM.

The memory 200 of the computing device 10 according to an embodiment may include the encrypted area 210 and the non-encrypted area 220.

The encrypted area 210 may be an area in which the encrypted data E_DATA is stored. The non-encrypted area 220 may be an area in which the non-encrypted command CMD and the non-encrypted completion COM are stored. The encrypted area 210 and the non-encrypted area 220 may be identified from each other based on an address of the storage space included in the memory 200.

The non-encrypted area 220 may include the SQ 221 and the CQ 222. The SQ 221 and the CQ 222 may constitute one set.

The SQ 221 may be a buffer in which a command generated by the processor 100 is stored until the command is executed by the storage device 300. The SQ 221 may store the non-encrypted command CMD.

The CQ 222 may be a buffer in which a completion generated by the storage device 300 is stored until the completion is transmitted to the processor 100. The CQ 222 may store the non-encrypted completion COM.

Figure 3:
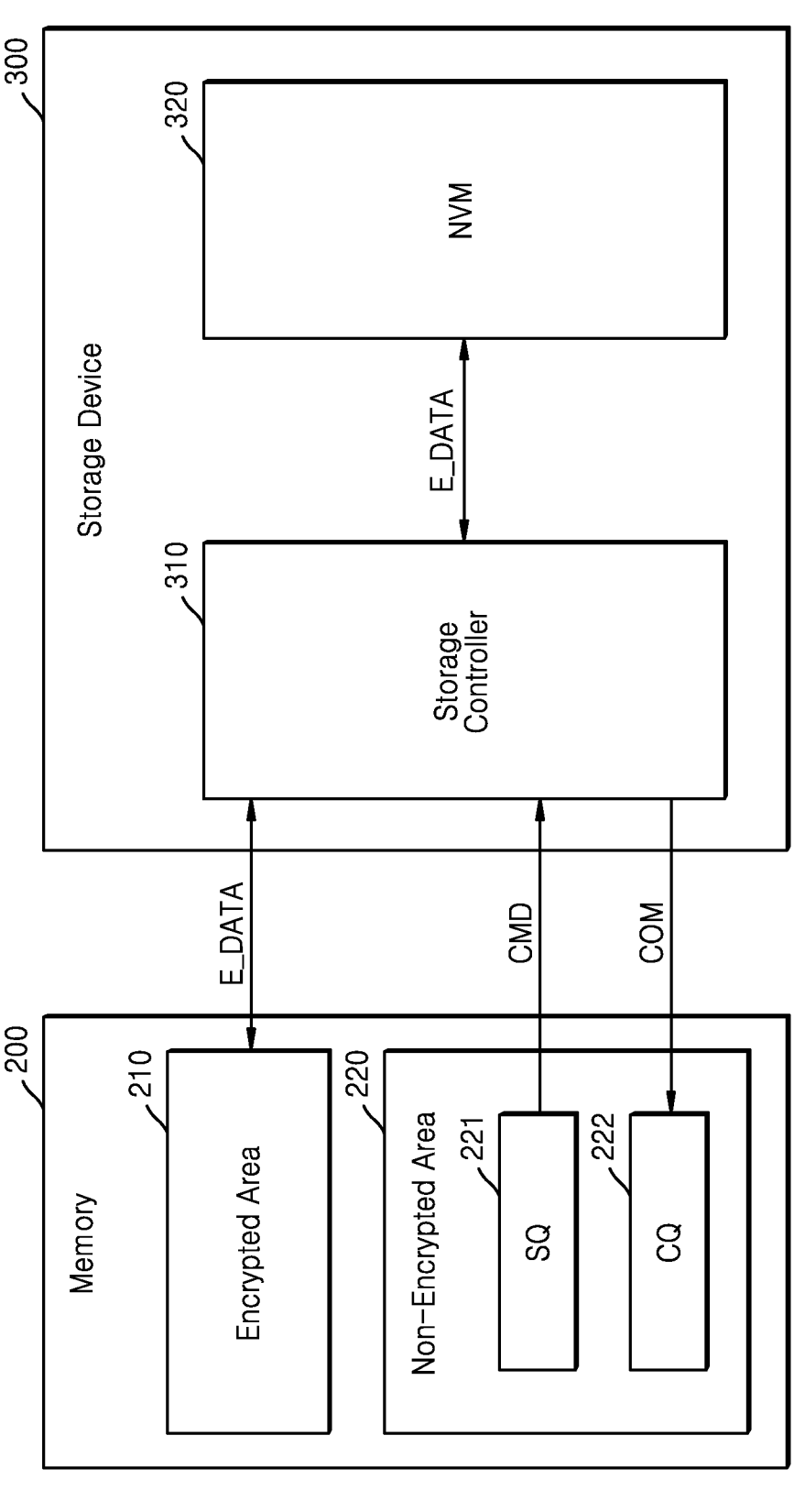
FIG. 3 is a block diagram illustrating in more detail a memory and a storage device of a computing device, according to an embodiment.

FIG. 3 is a block diagram illustrating in more detail a memory 200 and a storage device 300 of a computing device 10, according to an embodiment.

Referring to FIGS. 2 and 3 together, the storage device 300 according to an embodiment may include a storage controller 310 and a non-volatile memory 320.

The storage controller 310 may control an overall operation of the storage device 300. The storage controller 310 may operate based on a non-encrypted command CMD written into the memory 200 by the processor 100.

The storage controller 310 may fetch the non-encrypted command CMD from the memory 200.

In more detail, the storage controller 310 may read the non-encrypted command CMD from the memory 200. In this case, the storage controller 310 may read the non-encrypted command CMD from the SQ 221 of the non-encrypted area 220 of the memory 200.

Next, the storage controller 310 may decode the read non-encrypted command CMD. The storage controller 310 may determine a type of the non-encrypted command CMD based on a result of decoding the non-encrypted command CMD. The storage controller 310 may determine the type of the non-encrypted command CMD as one of a non-encrypted write command and a non-encrypted read command.

Because the storage controller 310 reads the non-encrypted command CMD, which is unencrypted, from the memory 200 by using the encryption key 141, the storage controller 310 may determine the type of the non-encrypted command CMD without a separate decryption process.

The storage controller 310 may transmit encrypted data E_DATA to the non-volatile memory 320 or the memory 200 based on the non-encrypted command CMD.

In an embodiment, when the non-encrypted command CMD is a non-encrypted write command, the storage controller 310 may read the encrypted data E_DATA from the memory 200. The non-encrypted write command may be a command that causes the processor 100 to store the encrypted data E_DATA in the storage device 300.

When the non-encrypted command CMD is a non-encrypted write command, the encrypted data E_DATA to be written into the storage device 300 by the processor 100 may be written into the encrypted area 210 of the memory 200. The storage controller 310 may read the encrypted data E_DATA from the encrypted area 210 of the memory 200.

The storage controller 310 may write the encrypted data E_DATA read from the memory 200 into the non-volatile memory 320. In this case, the storage controller 310 may write the encrypted data E_DATA into the non-volatile memory 320 as it is in an encrypted state, without separately decrypting the encrypted data E_DATA.

In an embodiment, when the non-encrypted command CMD is a non-encrypted read command, the storage controller 310 may read the encrypted data E_DATA from the non-volatile memory 320. The non-encrypted read command may be a command that causes the processor 100 to fetch the encrypted data E_DATA from the non-volatile memory 320 of the storage device 300.

When the non-encrypted command CMD is a non-encrypted read command, data may not be written into the encrypted area 210 of the memory 200. The storage controller 310 may write the encrypted data E_DATA read from the non-volatile memory 320 into the memory 200. The storage controller 310 may write the encrypted data E_DATA into the encrypted area 210 of the memory 200. In this case, the storage controller 310 may write the encrypted data E_DATA into the encrypted area 210 of the memory 200 as it is in an encrypted state, without separately decrypting the encrypted data E_DATA.

The storage controller 310 may transmit, to the memory 200, a non-encrypted completion COM indicating a result of executing the non-encrypted command CMD.

In more detail, the storage controller 310 may generate the non-encrypted completion COM indicating the result of executing the non-encrypted command CMD. For example, when writing of the encrypted data E_DATA according to the non-encrypted write command is completed, the storage controller 310 may generate a non-encrypted completion COM indicating completion of execution of the non-encrypted write command. As another example, when the writing of the encrypted data E_DATA according to the non-encrypted write command fails, the storage controller 310 may generate a non-encrypted completion COM indicating failure of execution of the non-encrypted write command.

The storage controller 310 may transmit the generated non-encrypted completion COM to the memory 200. The storage controller 310 may write the non-encrypted completion COM into the non-encrypted area 220 of the memory 200. In this case, the storage controller 310 may write the non-encrypted completion COM into the non-encrypted area 220 of the memory 200 as it is in an unencrypted state, without separately encrypting the non-encrypted completion COM. The non-encrypted completion COM written into the non-encrypted area 220 may be read by the processor 100.

The storage device 300 according to the embodiment as described above operates based on the non-encrypted command CMD and writes and reads the encrypted data E_DATA as it is, and thus, encryption key 141 may not be used. Accordingly, data security performance may be improved by preventing leakage of the encryption key 141 through the storage device 300.

Figure 4:
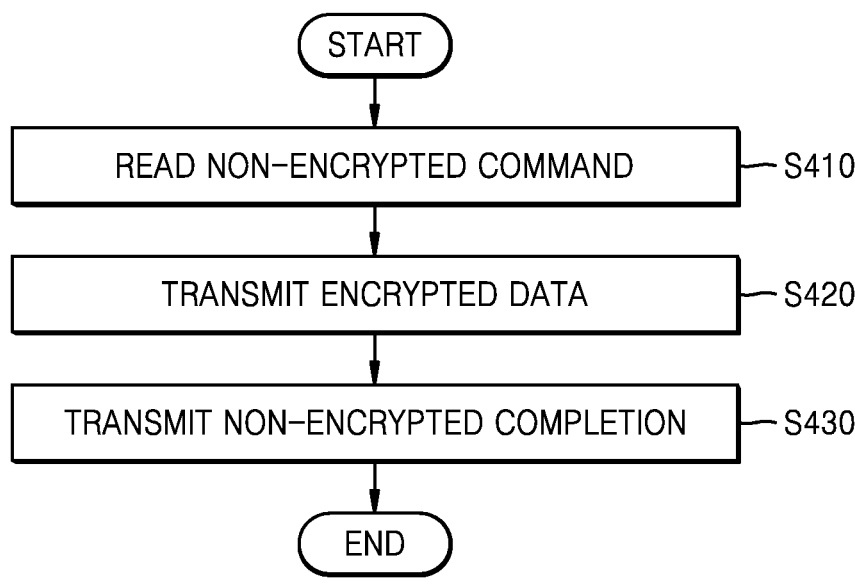
FIG. 4 is a flowchart illustrating an operating method of a storage device according to an embodiment.

FIG. 4 is a flowchart illustrating an operating method of a storage device according to an embodiment.

Referring to FIGS. 3 and 4 together, in operation S410, the storage device 300 may read the non-encrypted command CMD. The storage controller 310 of the storage device 300 may read the non-encrypted command CMD from the SQ 221 of the non-encrypted area 220 of the memory 200.

In operation S420, the storage device 300 may transmit encrypted data E_DATA. The storage controller 310 of the storage device 300 may transmit the encrypted data E_DATA to the memory 200 or the non-volatile memory 320 based on a type of the non-encrypted command CMD. This may be described in more detail with reference to FIG. 5.

Figure 5:
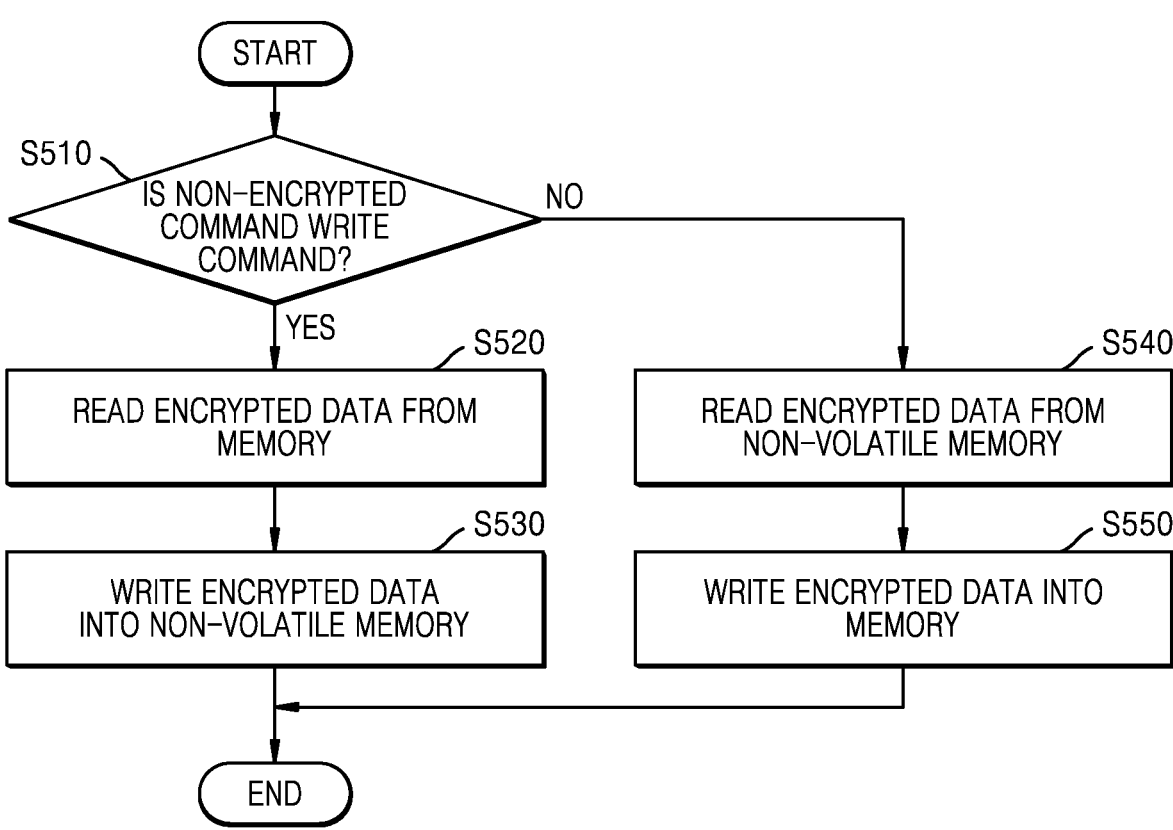
FIG. 5 is a flowchart illustrating in more detail a method, performed by a storage device, of transmitting encrypted data, according to an embodiment.

FIG. 5 is a flowchart illustrating in more detail a method, performed by a storage device, of transmitting encrypted data, according to an embodiment.

Referring to FIGS. 3 and 5 together, in operation S510, the storage device 300 may determine whether the non-encrypted command CMD is a non-encrypted write command. The storage controller 310 of the storage device 300 may decode the non-encrypted command CMD and determine a type of the non-encrypted command CMD as one of a non-encrypted write command and a non-encrypted read command.

When the non-encrypted command CMD is determined to be the non-encrypted write command in operation S510, the process proceeds to operation S520, and the storage device 300 may read encrypted data E_DATA from the memory 200. The storage controller 310 of the storage device 300 may read the encrypted data E_DATA from the encrypted area 210 of the memory 200.

Next, in operation S530, the storage device 300 may write the encrypted data E_DATA into the non-volatile memory 320. That is, the storage controller 310 of the storage device 300 may transmit the encrypted data E_DATA to the non-volatile memory 320, and accordingly, the non-volatile memory 320 may store the encrypted data E_DATA.

When it is determined in operation S510 that the non-encrypted command CMD is not the non-encrypted write command, the process proceeds to operation S540, and the storage device 300 may read the encrypted data E_DATA from the non-volatile memory 320. In other words, when the non-encrypted command CMD is determined to be the non-encrypted read command, the storage controller 310 of the storage device 300 may read the encrypted data E_DATA from the non-volatile memory 320.

Next, in operation S550, the storage device 300 may write the encrypted data E_DATA into the memory 200. That is, the storage controller 310 of the storage device 300 may transmit the encrypted data E_DATA to the memory 200, and accordingly, the memory 200 may store the encrypted data E_DATA. In this case, the encrypted data E_DATA may be written into the encrypted area 210 of the memory 200.

Referring back to FIGS. 3 and 4 together, in operation S430, the storage device 300 may transmit the non-encrypted completion COM. The storage controller 310 of the storage device 300 may generate the non-encrypted completion COM. The storage controller 310 may transmit the non-encrypted completion COM to the CQ 222 of the non-encrypted area 220 of the memory 200. Accordingly, the non-encrypted completion COM may be written into the CQ 222.

Figure 6:
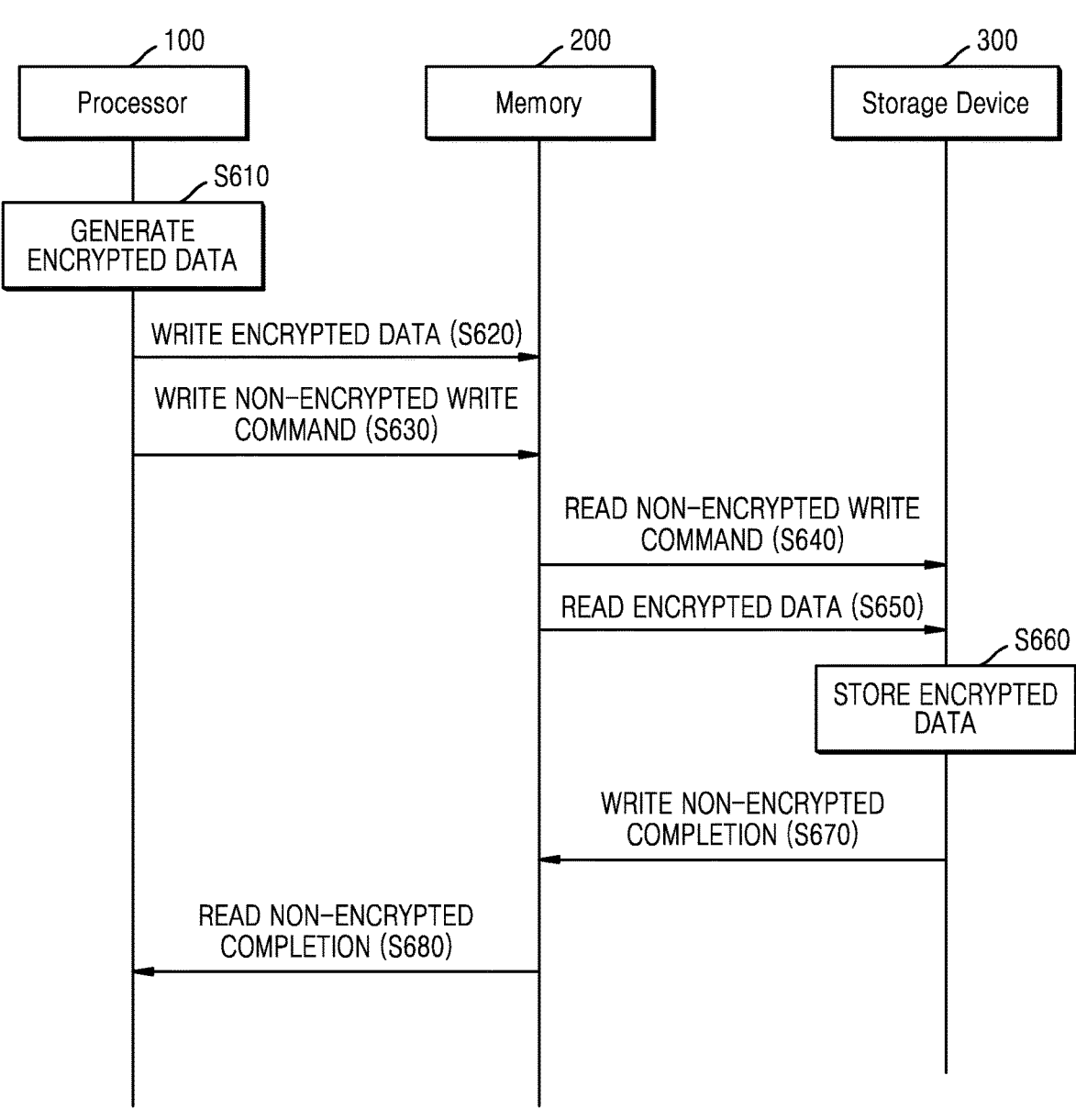
FIG. 6 is a flowchart illustrating an operation of writing encrypted data into a storage device in a computing device, according to an embodiment.

FIG. 6 is a flowchart illustrating an operation of writing encrypted data into a storage device 300 in a computing device, according to an embodiment.

Referring to FIGS. 2, 3, and 6 together, in operation S610, the processor 100 may generate the encrypted data E_DATA. The processor 100 may generate the encrypted data E_DATA by encrypting original data to be written into the storage device 300 by using the encryption key 141.

In operation S620, the processor 100 may write the encrypted data E_DATA into the memory 200. The processor 100 may write the encrypted data E_DATA into the encrypted area 210 of the memory 200. The processor 100 may identify a physical address of the encrypted area 210 of the memory 200 through the MMU 130 and write the encrypted data E_DATA to the physical address.

In operation S630, the processor 100 may write a non-encrypted write command into the memory 200. The processor 100 may write the non-encrypted write command into the SQ 221 of the non-encrypted area 220 of the memory 200. The processor 100 may identify a physical address of the SQ 221 of the non-encrypted area 220 of the memory 200 through the MMU 130 and write the non-encrypted write command to the physical address.

In operation S640, the storage device 300 may read the non-encrypted write command from the memory 200. The storage device 300 may read the non-encrypted write command from the SQ 221 of the non-encrypted area 220 of the memory 200. In this case, the storage device 300 may decode the read non-encrypted write command and identify that the read command is a non-encrypted write command.

In operation S650, the storage device 300 may read the encrypted data E_DATA from the memory 200. The storage device 300 may read, from the encrypted area 210 of the memory 200, the encrypted data E_DATA corresponding to the non-encrypted write command read in operation S640.

In operation S660, the storage device 300 may store the encrypted data E_DATA. The storage device 300 may store, in the internal non-volatile memory 320, the encrypted data E_DATA read in operation S650.

In operation S670, the storage device 300 may write a non-encrypted completion COM into the memory 200. The storage device 300 may generate a non-encrypted completion COM indicating a result of executing the non-encrypted write command read in operation S640. In addition, the storage device 300 may write the generated non-encrypted completion COM into the CQ 222 of the non-encrypted area 220 of the memory 200.

In operation S680, the processor 100 may read the non-encrypted completion COM from the memory 200. The processor 100 may read the non-encrypted completion COM from the CQ 222 of the non-encrypted area 220 of the memory 200. The processor 100 may identify, based on the non-encrypted completion COM, a result of executing the non-encrypted write command written in operation S630.

Figure 7:
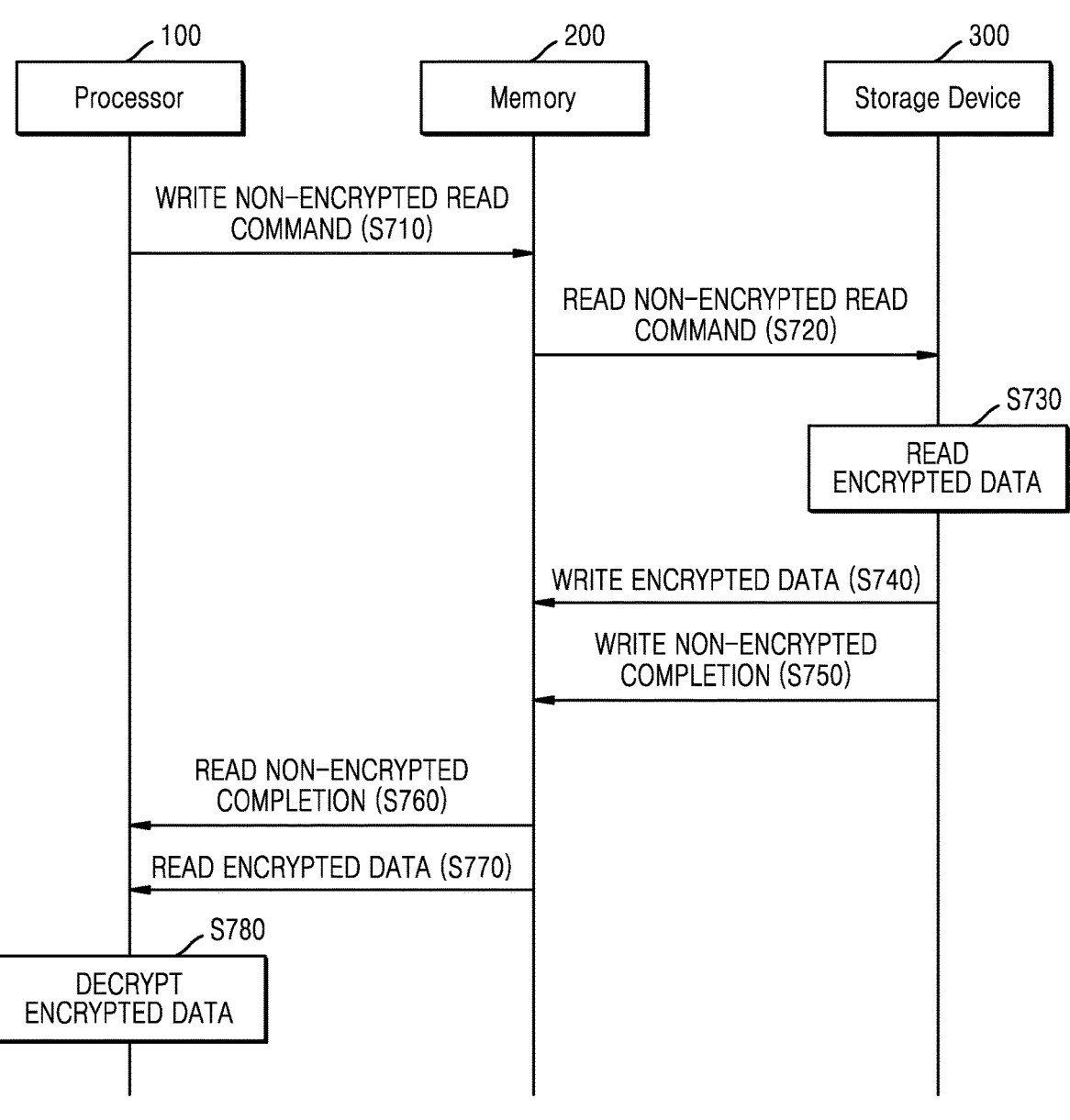
FIG. 7 is a flowchart illustrating an operation of reading encrypted data from a storage device in a computing device, according to an embodiment.

FIG. 7 is a flowchart illustrating an operation of reading encrypted data from a storage device 300 in a computing device, according to an embodiment.

Referring to FIGS. 2, 3, and 7 together, in operation S710, the processor 100 may write a non-encrypted read command into the memory 200. The processor 100 may write the non-encrypted read command into the SQ 221 of the non-encrypted area 220 of the memory 200. The processor 100 may identify a physical address of the SQ 221 of the non-encrypted area 220 of the memory 200 through the MMU 130 and write the non-encrypted read command to the physical address.

In operation S720, the storage device 300 may read the non-encrypted read command from the memory 200. The storage device 300 may read the non-encrypted read command from the SQ 221 of the non-encrypted area 220 of the memory 200. In this case, the storage device 300 may decode the read non-encrypted read command and identify that the read command is a non-encrypted read command.

In operation S730, the storage device 300 may read the encrypted data E_DATA from the internal non-volatile memory 320. The storage device 300 may read, from the non-volatile memory 320, the encrypted data E_DATA corresponding to the non-encrypted read command read in operation S720.

In operation S740, the storage device 300 may write the encrypted data E_DATA into the memory 200. The storage device 300 may write the encrypted data E_DATA into the encrypted area 210 of the memory 200.

In operation S750, the storage device 300 may write a non-encrypted completion COM into the memory 200. The storage device 300 may generate a non-encrypted completion COM indicating a result of executing the non-encrypted read command read in operation S720. In addition, the storage device 300 may write the generated non-encrypted completion COM into the CQ 222 of the non-encrypted area 220 of the memory 200.

In operation 760, the processor 100 may read the non-encrypted completion COM from the memory 200. The processor 100 may read the non-encrypted completion COM from the CQ 222 of the non-encrypted area 220 of the memory 200. The processor 100 may identify, based on the non-encrypted completion COM, a result of executing the non-encrypted read command written in operation S710.

In operation S770, the processor 100 may read the encrypted data E_DATA from the memory 200. The processor 100 may read the encrypted data E_DATA from the encrypted area 210 of the memory 200. In this case, when it is determined that the non-encrypted read command has been completed through the non-encrypted completion COM read in operation S760, the processor 100 may read the encrypted data E_DATA from the encrypted area 210 of the memory 200.

In operation S780, the processor 100 may unencrypt the encrypted data E_DATA. The processor 100 may generate original data by decrypting the encrypted data E_DATA read from the storage device 300 by using the encryption key 141.

When the computing device 10 according to the embodiment described above is used, encryption and decryption using the encryption key 141 are performed only by the processor 100, and by not using the encryption key 141 in the memory 200 and the storage device 300, leakage of the encryption key 141 through the memory 200 or the storage device 300 is prevented, and thus, the data security performance may be improved.

Figure 8:
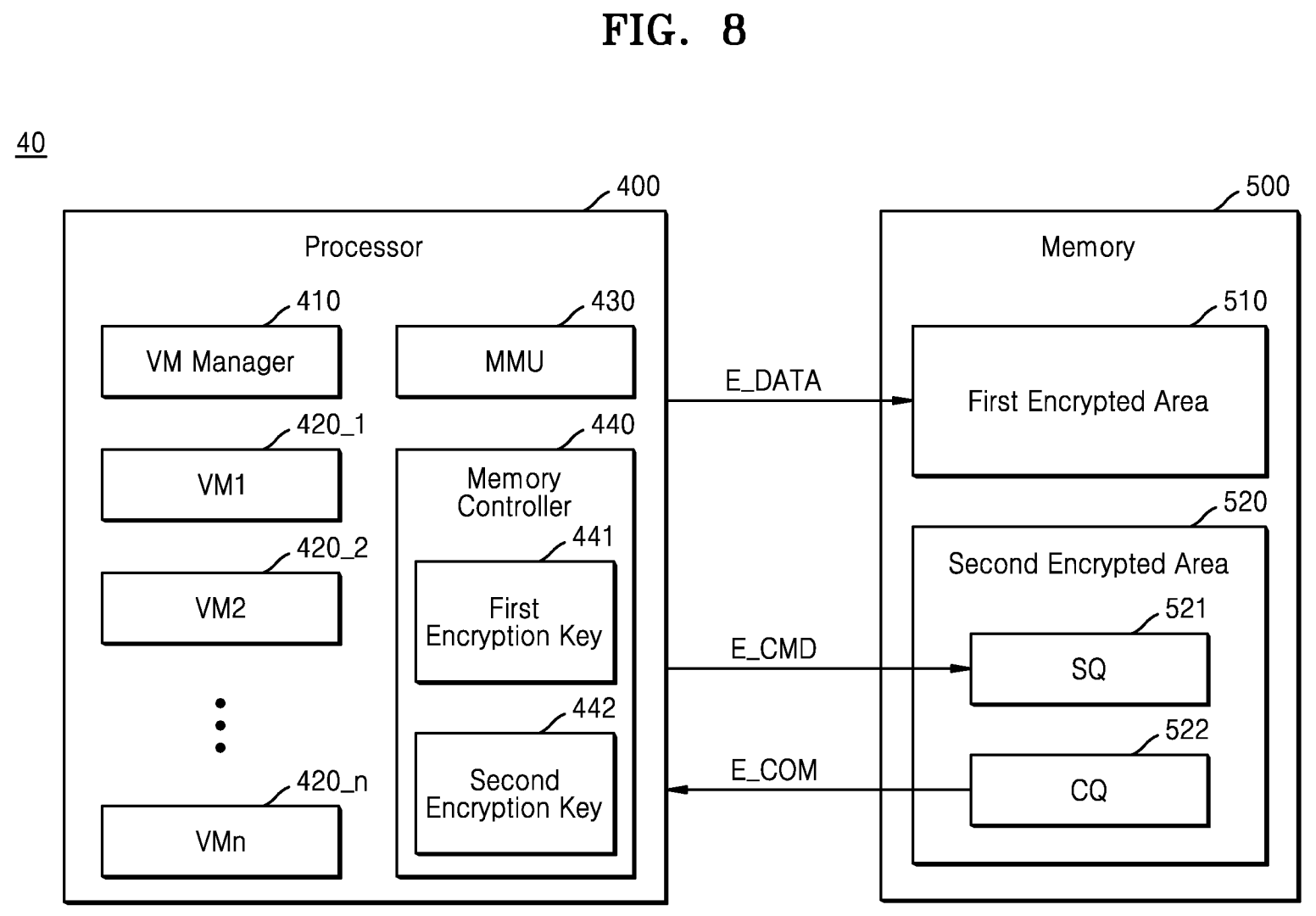

FIG. 8 is a block diagram of a processor and a memory 500 of a computing device according to an embodiment.

Referring to FIG. 8, a configuration of a processor 400 and a memory 500 included in a computing device 40 according to an embodiment may be identified.

The processor 400 of the computing device 40 may include a VM manager 410, a plurality of VMs 420_1 to 420_n, an MMU 430, and a memory controller 440. In this case, operations of the VM manager 410 and the plurality of VMs 420_1 to 420_n may be substantially the same as the operations of the VM manager 110 and the plurality of VMs 120_1 to 120_n of FIG. 2, and the description made above with reference to FIG. 2 may also be applied to the present embodiment. In addition, operations of the MMU 430 and the memory controller 440 may be similar to the operations of the MMU 130 and the memory controller 140 of FIG. 2, and thus, differences will be mainly described.

The MMU 430 may manage a first encrypted area 510 and a second encrypted area 520 of the memory 500. The MMU 430 may identify the first encrypted area 510 and the second encrypted area 520 of the memory 500 from one another based on a physical address of a storage space included in the memory 500.

The memory controller 440 may operate based on a non-encrypted command and original data transmitted from the plurality of VMs 420_1 to 420_n.

When the plurality of VMs 420_1 to 420_n are to write data into a storage device, the memory controller 440 may generate encrypted data E_DATA by encrypting the original data, and generate an encrypted command E_CMD by encrypting a non-encrypted command.

The memory controller 440 may generate encrypted data E_DATA by encrypting data by using a first encryption key 441.

The first encryption key 441 is a key used for encryption and decryption of original data and may include a dedicated encryption key used inside the processor 400. In this case, the dedicated encryption key may only be used for encryption of original data in the memory controller 440 inside the processor 400, and may not be transmitted to the outside of the processor 400 or shared with other devices outside the processor 400. Accordingly, the encrypted data E_DATA may not be decrypted outside the processor 400, and leakage of the first encryption key 441 through the storage device or the memory 500 may be prevented.

The memory controller 440 may write the encrypted data E_DATA into the first encrypted area 510 of the memory 500.

The memory controller 440 may generate the encrypted command E_CMD by encrypting the non-encrypted command by using a second encryption key 442.

The second encryption key 442 is a key used for encryption and decryption of a command and a completion and may be a common encryption key used in the processor 400 and the storage device. In this case, the common encryption key may be used in both the memory controller 440 of the processor 400 and a storage controller of the storage device and may be shared between the processor 400 and the storage device. In this regard, the first encryption key 441 and the second encryption key 442 may be different from each other. Accordingly, even when the second encryption key 442 is leaked outside the processor 400, the encrypted data E_DATA may not be decrypted by using the second encryption key 442, and thus, the data security performance may be improved.

Overall, the processor 100 may be configured with the first encryption key 441 which is not shared with the memory 500 and not shared with the storage device 600. The first key may be used for data encryption and decryption. See FIG. 6 item S610 and FIG. 7 item S780. A second encryption key 442, in some embodiments, is shared with the memory 500 and/or the storage device 600. The second key is used, in some embodiments, for encryption and decryption of commands such as read and write commands, and queue management handshaking signals such as completion signals. See FIG. 10 items S1040 and S1070, and FIG. 11 items S1140 and S1170, for example. Since the second encryption key 442 may be shared over a bus, there is a possibility that the second encryption key 442 is leaked to an adverse party. However, the data remains unreadable by the adverse party because the first key is not shared outside of the processor. See FIG. 7, items S740 and S760, for example. The first encryption key 441 may be installed in the processor 100 in a controlled environment, for example, during fabrication of the processor 100 before distribution in a supply chain.

The memory controller 440 may store the encrypted command E_CMD in an SQ 521 of the second encrypted area 520 of the memory 500.

When the plurality of VMs 420_1 to 420_n are to read data stored in the storage device, the memory controller 440 may write the encrypted command E_CMD into the memory 500. In this case, the memory controller 440 may encrypt the encrypted command E_CMD by using the second encryption key 442 and store the same in the SQ 521 of the second encrypted area 520 of the memory 500.

The memory controller 440 may read an encrypted completion E_COM from the memory 500. In this case, the memory controller 440 may read the encrypted completion E_COM from a CQ 522 of the second encrypted area 520 of the memory 500.

The memory controller 440 may identify a result of the storage device executing the encrypted command E_CMD based on the encrypted completion E_COM. In this case, the memory controller 440 may obtain a non-encrypted completion by decrypting the encrypted completion E_COM by using the second encryption key 442, and identify the result of the storage device executing the encrypted command E_CMD based on the non-encrypted completion.

The memory 500 of the computing device 40 according to an embodiment may include the first encrypted area 510 and the second encrypted area 520.

The first encrypted area 510 may be an area in which the encrypted data E_DATA is stored. The second encrypted area 520 may be an area in which the encrypted command E_CMD and the encrypted completion E_COM are stored. The first encrypted area 510 and the second encrypted area 520 may be identified from each other based on an address of the storage space included in the memory 500.

The second encrypted area 520 may include the SQ 521 and the CQ 522. The SQ 521 and the CQ 522 may constitute one set. The SQ 521 may store the encrypted command E_CMD. The CQ 522 may store the encrypted completion E_COM.

Figure 9:
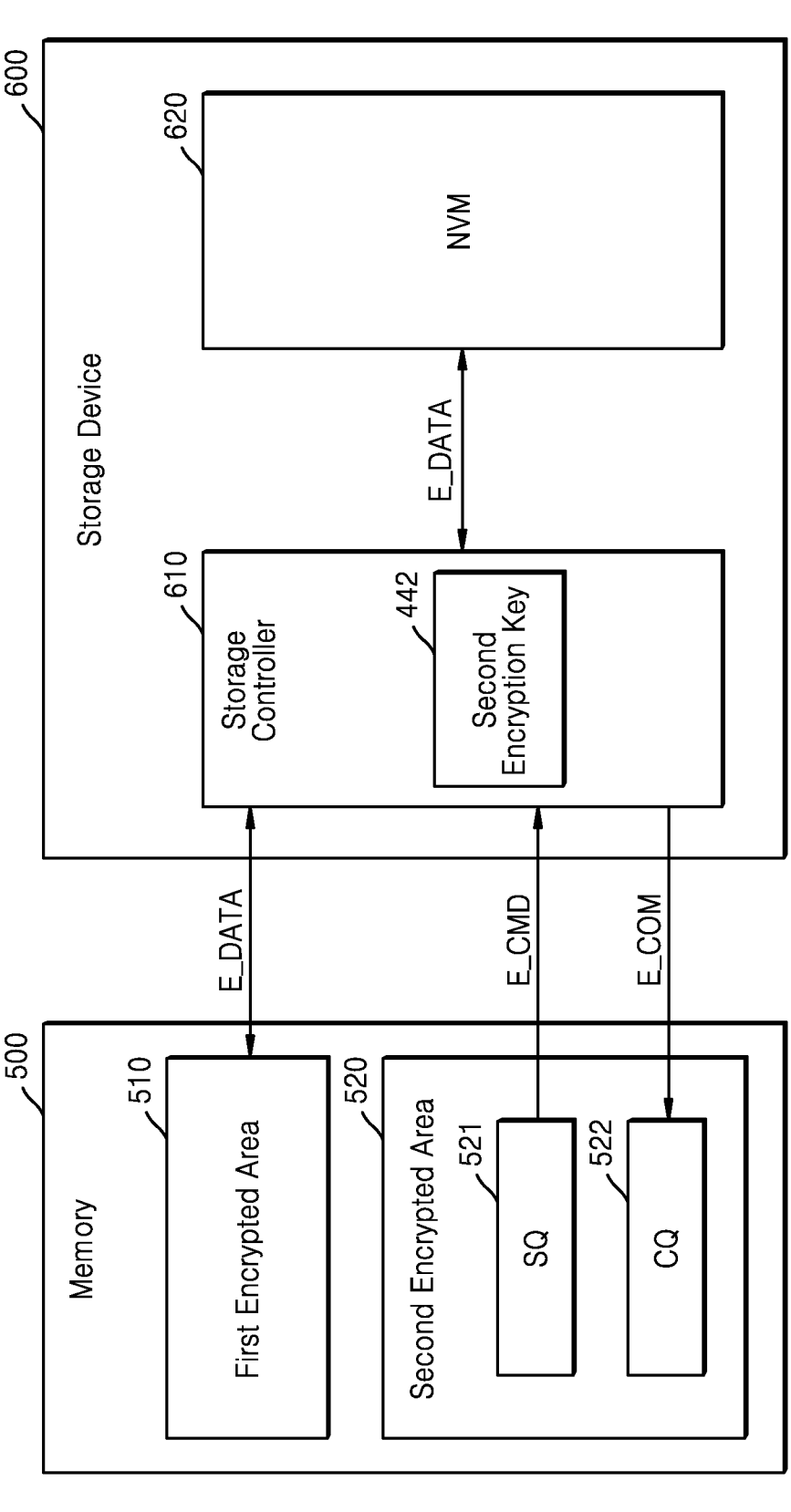
FIG. 9 is a block diagram of a memory and a storage device of a computing device according to an embodiment.

FIG. 9 is a block diagram of a memory 500 and a storage device 600 of a computing device 40 according to an embodiment.

Referring to FIGS. 8 and 9 together, the storage device 600 according to an embodiment may include a storage controller 610 and a non-volatile memory 620.

The storage controller 610 may fetch an encrypted command E_CMD from the memory 500.

In more detail, the storage controller 610 may read the encrypted command E_CMD from the memory 500. In this case, the storage controller 610 may read the encrypted command E_CMD from the SQ 521 of the second encrypted area 520 of the memory 500.

Next, the storage controller 610 may decrypt the encrypted command E_CMD. The storage controller 610 may generate a non-encrypted command by decrypting the encrypted command E_CMD by using the second encryption key 442. In addition, the storage controller 610 may determine a type of the encrypted command E_CMD based on a result of decoding the non-encrypted command. The storage controller 610 may determine the type of the encrypted command E_CMD as one of a write command and a read command.

In this case, the second encryption key 442 may be the same as the second encryption key 442 used in the processor 400 and the memory controller 440. That is, the second encryption key 442 used in the processor 400 may be shared with the storage device 600.

The storage controller 610 may transmit encrypted data E_DATA to the non-volatile memory 620 or the memory 500 based on the type of the encrypted command E_CMD.

In an embodiment, when the type of the encrypted command E_CMD is a write command, the storage controller 610 may read the encrypted data E_DATA from the memory 500. The write command may be a command that causes the processor 400 to store the encrypted data E_DATA in the storage device 600.

When the type of the encrypted command E_CMD is a write command, the encrypted data E_DATA to be written into the storage device 600 by the processor 400 may be written into the first encrypted area 510 of the memory 500. The storage controller 610 may read the encrypted data E_DATA from the first encrypted area 510 of the memory 500.

The storage controller 610 may write the encrypted data E_DATA read from the memory 500 into the non-volatile memory 620. In this case, the encrypted data E_DATA is encrypted by using the first encryption key 441 different from the second encryption key 442, the storage controller 610 may not obtain original data by decrypting the encrypted data E_DATA. Accordingly, the storage controller 610 may write the encrypted data E_DATA into the non-volatile memory 620 as it is in an encrypted state, without separately decrypting the encrypted data E_DATA.

In an embodiment, when the type of the encrypted command E_CMD is a read command, the storage controller 610 may read the encrypted data E_DATA from the non-volatile memory 620. The read command may be a command that causes the processor 400 to fetch the encrypted data E_DATA from the non-volatile memory 620 of the storage device 600.

When the type of the encrypted command E_CMD is a read command, data may not be written into the first encrypted area 510 of the memory 500. The storage controller 610 may write the encrypted data E_DATA read from the non-volatile memory 620 into the memory 500. The storage controller 610 may write the encrypted data E_DATA into the first encrypted area 510 of the memory 500. In this case, the storage controller 610 may write the encrypted data E_DATA into the first encrypted area 510 of the memory 500 as it is in an encrypted state, without separately decrypting the encrypted data E_DATA.

The storage controller 610 may transmit, to the memory 500, an encrypted completion E_COM indicating a result of executing the encrypted command E_CMD.

In more detail, the storage controller 610 may generate the non-encrypted completion indicating the result of executing the encrypted command E_CMD. For example, when writing of the encrypted data E_DATA according to the write command is completed, the storage controller 610 may generate a non-encrypted completion indicating completion of execution of the write command. As another example, when writing of the encrypted data E_DATA according to the write command fails, the storage controller 610 may generate a non-encrypted completion indicating failure of execution of the write command.

The storage controller 610 may generate an encrypted completion E_COM by encrypting the generated non-encrypted completion by using the second encryption key 442. In this case, the second encryption key 442 is shared with the processor 400, the processor 400 may identify the result of executing the encrypted command E_CMD by decrypting the encrypted completion E_COM.

The storage controller 610 may transmit the generated encrypted completion E_COM to the memory 500. The storage controller 610 may write the encrypted completion E_COM into the second encrypted area 520 of the memory 500. The encrypted completion E_COM written into the second encrypted area 520 may be read by the processor 400.

The computing device 40 according to the embodiment as described above encrypts data by using the first encryption key 441, encrypts a command and a completion by using the second encryption key 442 different from the first encryption key 441, and uses the first encryption key 441 in the processor 400, and thus, the data security performance may be improved.

Figure 10:
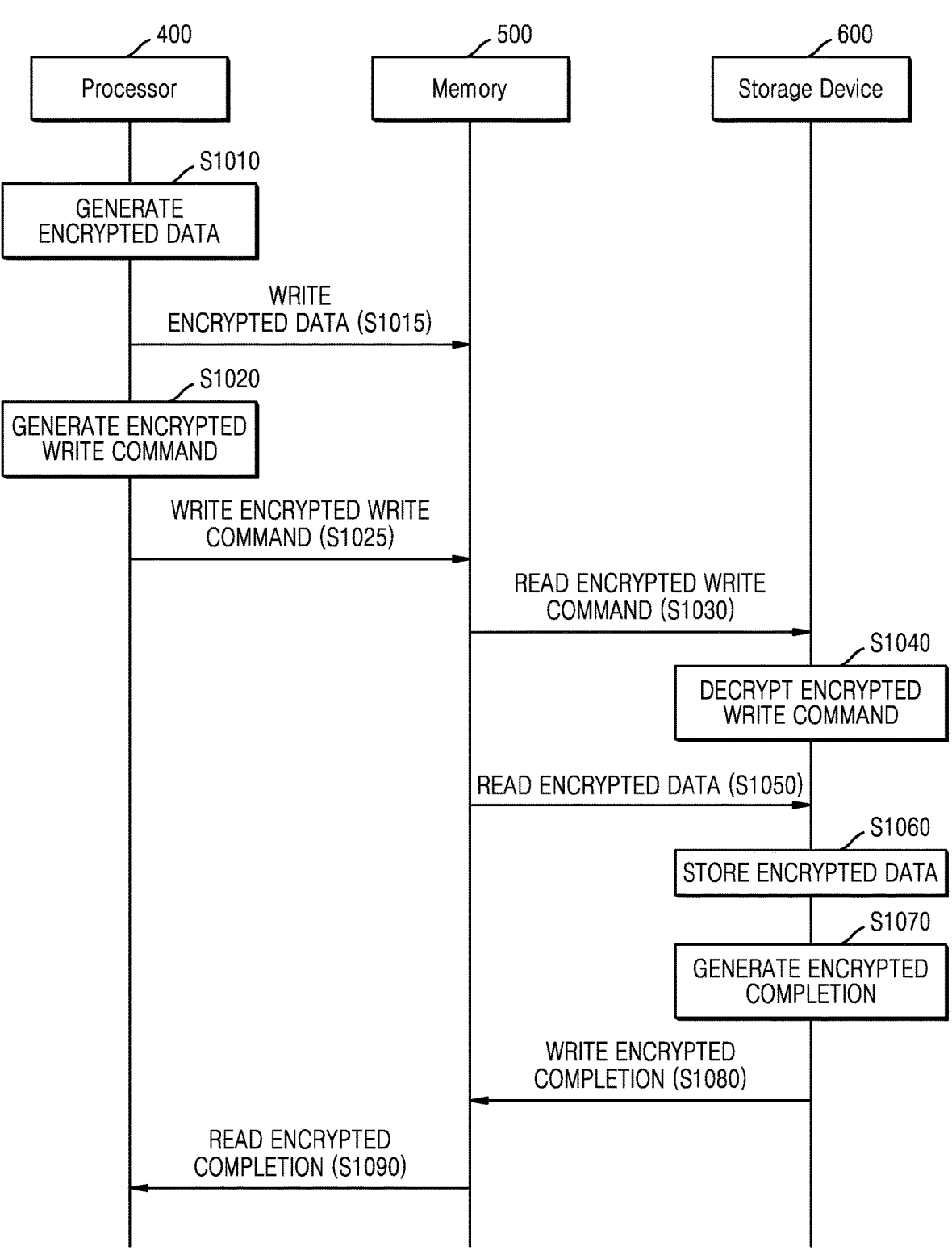
FIG. 10 is a flowchart illustrating an operation of writing encrypted data into a storage device in a computing device, according to an embodiment.

FIG. 10 is a flowchart illustrating an operation of writing encrypted data into a storage device 600 in a computing device, according to an embodiment.

Referring to FIGS. 8, 9, and 10 together, in operation S1010, the processor 400 may generate encrypted data E_DATA. The processor 400 may generate the encrypted data E_DATA by encrypting original data to be written into the storage device 600 by using the first encryption key 441.

In operation S1015, the processor 400 may write the encrypted data E_DATA into the memory 500. The processor 400 may write the encrypted data E_DATA into the first encrypted area 510 of the memory 500. The processor 400 may identify a physical address of the first encrypted area 510 of the memory 500 through the MMU 430 and write the encrypted data E_DATA to the physical address.

In operation S1020, the processor 400 may generate an encrypted write command. The processor 400 may generate an encrypted write command by encrypting a write command by using the second encryption key 442.

In operation S1025, the processor 400 may write the encrypted write command into the memory 500. The processor 400 may write the encrypted write command into the SQ 521 of the second encrypted area 520 of the memory 500. The processor 400 may identify a physical address of the SQ 521 of the second encrypted area 520 of the memory 500 through the MMU 430 and write the encrypted write command to the physical address.

In operation S1030, the storage device 600 may read the encrypted write command from the memory 500. The storage device 600 may read the encrypted write command from the SQ 521 of the second encrypted area 520 of the memory 500.

In operation S1040, the storage device 600 may decrypt the encrypted write command read from the memory 500. The storage device 600 may obtain a non-encrypted write command by decrypting the encrypted write command by using the second encryption key 442. In addition, the storage device 600 may decode the non-encrypted write command and identify that the read command is an encrypted write command.

In operation S1050, the storage device 600 may read the encrypted data E_DATA from the memory 500. The storage device 600 may read, from the first encrypted area 510 of the memory 500, the encrypted data E_DATA corresponding to the encrypted write command read in operation S1030.

In operation S1060, the storage device 600 may store the encrypted data E_DATA. The storage device 600 may store, in the internal non-volatile memory 620, the encrypted data E_DATA read in operation S1050.

In operation S1070, the storage device 600 may generate an encrypted completion E_COM. The storage device 600 may generate an encrypted completion E_COM indicating a result of executing the encrypted write command read in operation S1030.

In operation S1080, the storage device 600 may write the encrypted completion E_COM into the memory 500. The storage device 600 may write the encrypted completion E_COM generated in operation S1070 into the CQ 522 of the second encrypted area 520 of the memory 500.

In operation S1090, the processor 400 may read the encrypted completion E_COM from the memory 500. The processor 400 may read the encrypted completion E_COM from the CQ 522 of the second encrypted area 520 of the memory 500. The processor 400 may identify a result of executing the encrypted write command written in operation S1015, by decrypting the encrypted completion E_COM by using the second encryption key 442.

Figure 11:
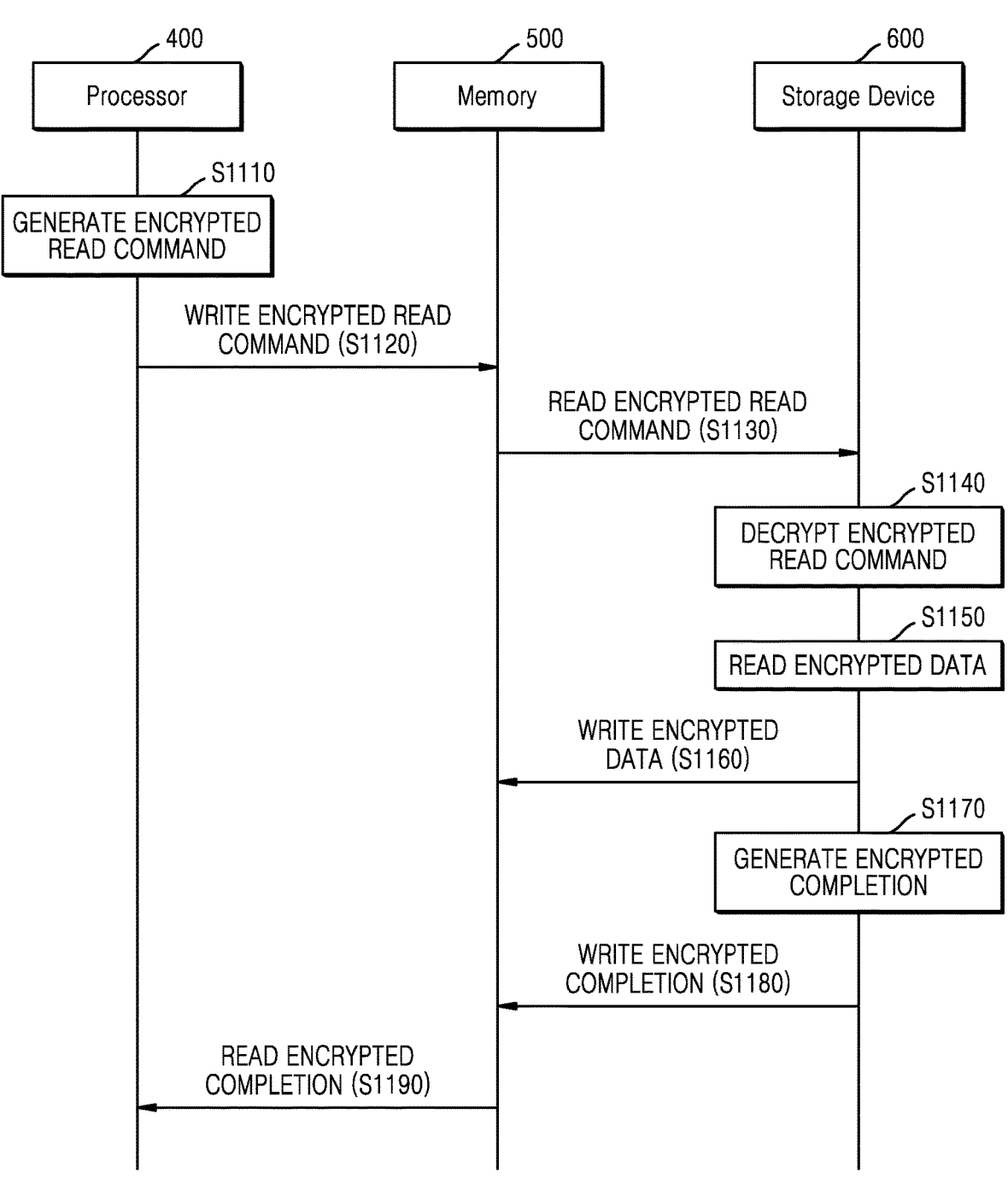
FIG. 11 is a flowchart illustrating an operation of reading encrypted data from a storage device in a computing device, according to an embodiment.

FIG. 11 is a flowchart illustrating an operation of reading encrypted data from a storage device 600 in a computing device, according to an embodiment.

Referring to FIGS. 8, 9, and 11 together, in operation S1110, the processor 400 may generate an encrypted read command. The processor 400 may generate an encrypted read command by encrypting a read command by using the second encryption key 442.

In operation S1120, the processor 400 may write the encrypted read command into the memory 500. The processor 400 may write the encrypted read command into the SQ 521 of the second encrypted area 520 of the memory 500. The processor 400 may identify a physical address of the SQ 521 of the second encrypted area 520 of the memory 500 through the MMU 430 and write the encrypted read command to the physical address.

In operation S1130, the storage device 600 may read the encrypted read command from the memory 500. The storage device 600 may read the encrypted read command from the SQ 521 of the second encrypted area 520 of the memory 500.

In operation S1140, the storage device 600 may decrypt the encrypted read command read from the memory 500. The storage device 600 may obtain a non-encrypted read command by decrypting the encrypted read command by using the second encryption key 442. In addition, the storage device 600 may decode the non-encrypted read command and identify that the read command is an encrypted read command.

In operation S1150, the storage device 600 may read the encrypted data E_DATA from the internal non-volatile memory 620. The storage device 600 may read, from the non-volatile memory 620, the encrypted data E_DATA corresponding to the encrypted read command read in operation S1130.

In operation S1160, the storage device 600 may write the encrypted data E_DATA into the memory 500. The storage device 600 may write the encrypted data E_DATA into the first encrypted area 510 of the memory 500.

In operation S1170, the storage device 600 may generate an encrypted completion E_COM. The storage device 600 may generate an encrypted completion E_COM indicating a result of executing the encrypted read command read in operation S1130.

In operation S1180, the storage device 600 may write the encrypted completion E_COM into the memory 500. The storage device 600 may write the encrypted completion E_COM generated in operation S1170 into the CQ 522 of the second encrypted area 520 of the memory 500.

In operation S1190, the processor 400 may read the encrypted completion E_COM from the memory 500. The processor 400 may read the encrypted completion E_COM from the CQ 522 of the second encrypted area 520 of the memory 500. The processor 400 may identify a result of executing the encrypted read command written in operation S1120, by decrypting the encrypted completion E_COM by using the second encryption key 442.

After operation S1190, the processor 400 may read the encrypted data E_DATA from the first encrypted area 510 of the memory 500. In this case, when it is determined that the encrypted read command has been completed through the encrypted completion E_COM read in operation S1190, the processor 400 may read the encrypted data E_DATA from the first encrypted area 510 of the memory 500. In addition, the processor 400 may generate original data by decrypting the encrypted data E_DATA read from the storage device 600 by using the first encryption key 441.

When the computing device 40 according to the embodiment as described above is used, data is encrypted by using the first encryption key 441, a command and a completion are encrypted by using the second encryption key 442 different from the first encryption key 441, and the first encryption key 441 is used in the processor 400, and thus, the data security performance may be improved.

Figure 12:
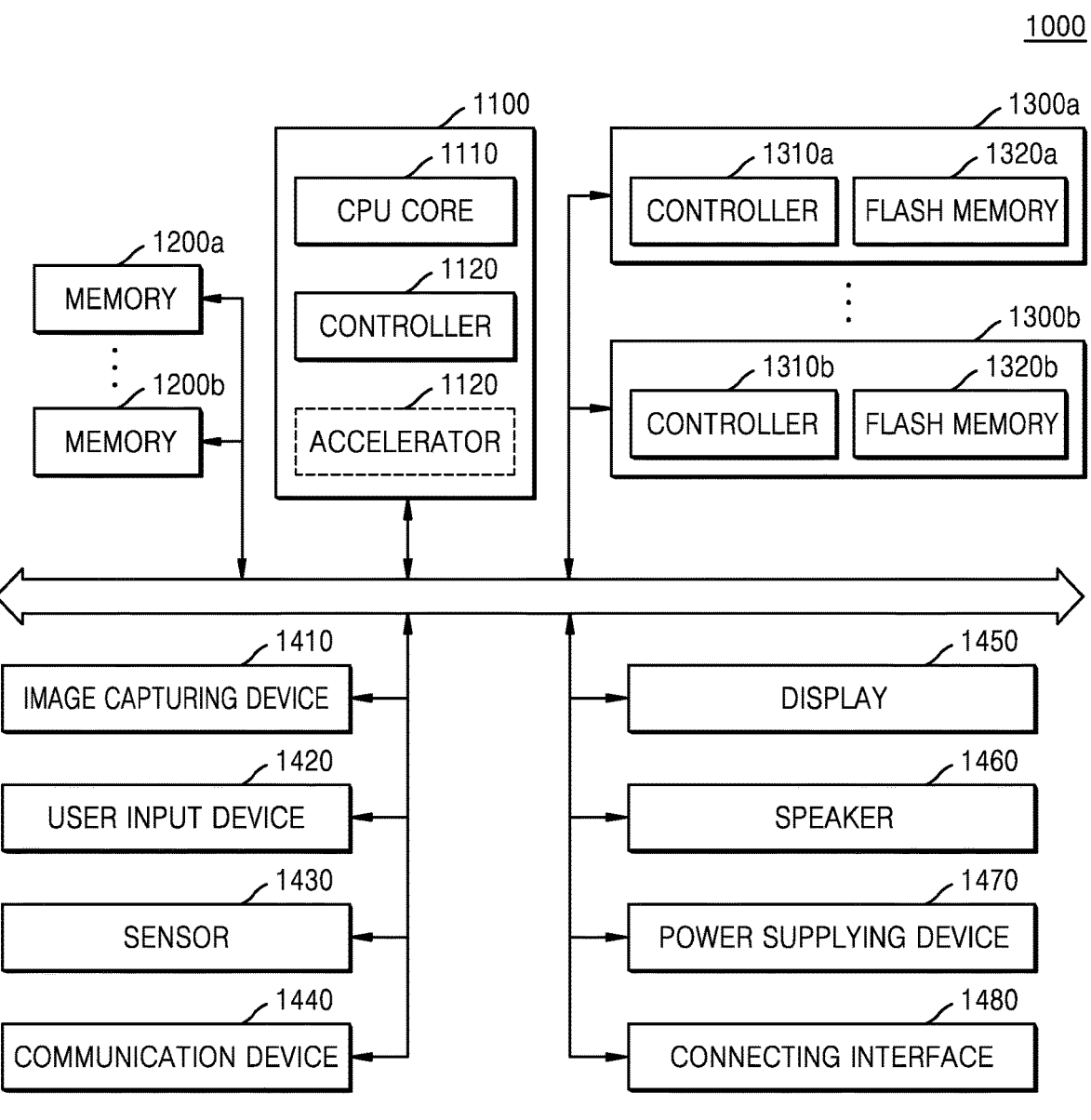
FIG. 12 is a diagram of a system to which a computing device is applied, according to an embodiment.

FIG. 12 is a diagram of a system 1000 to which a computing device is applied, according to an embodiment.

The system 1000 of FIG. 12 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 12 is not necessarily limited to the mobile system and may be a PC, a laptop computer, a server, a media player, or an automotive device (e.g., a navigation device).

Referring to FIG. 12, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as SRAM and/or DRAM, each of the memories 1200*a* and 1200*b* may include non-volatile memory, such as a flash memory, PRAM and/or RRAM. The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300a and 1300b may respectively include storage controllers (STRG CTRL) 1310a and 1310b and non-volatile memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of SSDs or memory cards and be removably combined with other components of the system 1000 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The main processor 1100 of the system 1000 of FIG. 12 may be configured to include the processor 100 described above with reference to FIG. 2 or the processor 400 described above with reference to FIG. 8. Also, the memories 1200a and 1200b of the system 1000 of FIG. 12 may be configured to include the memory 200 described above with reference to FIG. 2 and the memory 500 described above with reference to FIG. 8. In addition, the storage devices 1300a and 1300b of the system 1000 of FIG. 12 may be configured to include the storage device 300 described above with reference to FIG. 3 or the storage device 600 described above with reference to FIG. 9.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

As described above, the embodiments have been disclosed with reference to the drawings. Although the embodiments have been described using specific terms herein, this is only used for the purpose of describing the technical spirit of the disclosure and is not used to limit the meaning or scope set forth in the claims. Therefore, those of ordinary skill in the art will understand that various modifications and other equivalent embodiments may be made therefrom. Accordingly, the true technical scope of protection should be determined by the technical spirit of the appended claims.

Various changes in form and details may be made therein without departing from the spirit and scope of the following claims.

What is claimed is:

1. A storage device comprising:
a non-volatile memory; and
a storage controller configured to:
    read a non-encrypted command from a memory outside the storage device, wherein the non-encrypted command was written to the memory by a virtual machine of a processor via a memory controller of the processor,
    transmit encrypted data to the non-volatile memory, based on the non-encrypted command, wherein the encrypted data was written to the memory from the virtual machine, and
    transmit a non-encrypted completion to the memory, wherein the non-encrypted completion indicates a result of executing the non-encrypted command.

2. The storage device of claim 1, wherein the storage controller is further configured to read the non-encrypted command from a non-encrypted area of the memory.

3. The storage device of claim 1, wherein the non-encrypted command is written in a non-encrypted area of the memory from the processor outside the storage device.

4. The storage device of claim 1, wherein the storage controller is further configured to, when the non-encrypted command is a write command:
read the encrypted data from the memory, and
write the encrypted data into the non-volatile memory.

5. The storage device of claim 4, wherein the encrypted data is written into an encrypted area of the memory from the processor outside the storage device.

6. The storage device of claim 1, wherein the storage controller is further configured to, when the non-encrypted command is a read command, read the encrypted data from the non-volatile memory and write the encrypted data into the memory.

7. The storage device of claim 6, wherein the storage controller is further configured to write the encrypted data into an encrypted area of the memory.

8. The storage device of claim 1, wherein the storage controller is further configured to write the non-encrypted completion into a non-encrypted area of the memory.

9. A computing device comprising:
a memory;
a processor configured to:
    generate data by a virtual machine of the processor,
    generate encrypted data by encrypting the data,
    write the encrypted data into the memory, and write, by the virtual machine, a non-encrypted write command into the memory; and a storage device comprising a non-volatile memory and a storage controller, wherein the storage controller is configured to:

read the non-encrypted write command from the memory, transmit the encrypted data to the non-volatile memory based on the non-encrypted write command, and transmit a non-encrypted completion to the memory, and wherein the non-encrypted completion indicates a result of executing the non-encrypted write command.

10. The computing device of claim 9, wherein the processor is further configured to generate the encrypted data by using a dedicated encryption key used inside the processor.

11. The computing device of claim 9, wherein the memory comprises:

an encrypted area storing the encrypted data; and a non-encrypted area storing a non-encrypted command and the non-encrypted completion.

12. The computing device of claim 11, wherein the processor is further configured to:

write the encrypted data into the encrypted area of the memory, and write the non-encrypted write command into the non-encrypted area of the memory.

13. The computing device of claim 11, wherein the storage controller is further configured to:

read the non-encrypted write command from the non-encrypted area of the memory, read the encrypted data from the encrypted area of the memory, and write the encrypted data into the non-volatile memory.

14. The computing device of claim 11, wherein the storage controller is further configured to write the non-encrypted completion into the non-encrypted area of the memory.

15. A computing device comprising:

a memory;

a processor configured to:

generate data by a virtual machine of the processor, generate encrypted data by encrypting the data by using a first encryption key, write the encrypted data into the memory, generate an encrypted write command by encrypting a write command by using a second encryption key, and write, by the virtual machine, the encrypted write command into the memory; and a storage device comprising a non-volatile memory and a storage controller, wherein the storage controller is configured to:

read the encrypted write command from the memory, generate the write command by decrypting the encrypted write command by using the second encryption key, transmit the encrypted data to the non-volatile memory based on the write command, and transmit an encrypted completion to the memory, and wherein the encrypted completion indicates a result of executing the write command.

16. The computing device of claim 15, wherein the first encryption key is a dedicated encryption key used inside the processor, and the second encryption key is a common encryption key used in the processor and in the storage controller.

17. The computing device of claim 16, wherein the processor is further configured to set the second encryption key to be different from the first encryption key and transmit the second encryption key to the storage device.

18. The computing device of claim 15, wherein the memory comprises:

a first encrypted area storing the encrypted data; and a second encrypted area storing an encrypted command and the encrypted completion.

19. The computing device of claim 18, wherein the storage controller is further configured to:

generate a completion based on the result of executing the write command, and generate the encrypted completion by encrypting the completion using the second encryption key.

20. The computing device of claim 19, wherein the storage controller is further configured to write the encrypted completion into the second encrypted area of the memory.

* * * * *